United States Patent
Corwin et al.

[11] Patent Number: 6,092,188
[45] Date of Patent: Jul. 18, 2000

[54] PROCESSOR AND INSTRUCTION SET WITH PREDICT INSTRUCTIONS

[75] Inventors: Michael P. Corwin, Palo Alto; Tse-Yu Yeh, Milpitas; Mircea Poplingher, Palo Alto; Carl C. Scafidi, Hollister, all of Calif.

[73] Assignee: Intel Corporation, Santa Clara, Calif.

[21] Appl. No.: 09/348,406

[22] Filed: Jul. 7, 1999

Related U.S. Application Data

[63] Continuation of application No. 08/997,519, Dec. 23, 1997, abandoned.

[51] Int. Cl.[7] .................................................... G06F 15/00
[52] U.S. Cl. ..................... 712/239; 712/233; 712/234; 712/235; 712/236; 712/237; 712/238; 712/239
[58] Field of Search ........................... 712/1–43, 200–248

[56] References Cited

U.S. PATENT DOCUMENTS

| | | | |
|---|---|---|---|
| 5,742,804 | 4/1998 | Yeh et al. ................................ | 712/237 |
| 5,805,878 | 9/1998 | Rahman et al. .......................... | 712/239 |
| 5,940,857 | 8/1999 | Nakanishi et al. ...................... | 711/137 |

*Primary Examiner*—John A. Follansbee
*Assistant Examiner*—S. Whitmore
*Attorney, Agent, or Firm*—Seth Z. Kalson

[57] ABSTRACT

A processor architecture with an instruction set having a predict instruction, the predict instruction providing static prediction information and a statically predicted target address to the processor for a branch instruction. The processor decodes a predict instruction to obtain an associated pair of addresses comprising a predicted target address and a referenced instruction address, and fetches a predicted target instruction having an instruction address matching the predicted target address when a fetched and decoded branch instruction has an instruction address matching the referenced instruction address.

3 Claims, 2 Drawing Sheets

PROCESSOR AND INSTRUCTION SET WITH PREDICT INSTRUCTIONS

This application is a continuation of application Ser. No. 08/997,519, filed Dec. 23 1997, now abandoned.

FIELD OF THE INVENTION

The present invention relates to processor architectures and instruction sets, and in particular, to processor architectures with instruction sets that provide prediction instructions.

BACKGROUND

In a computer system, for a given thread of computation, the next instruction to be executed after a conditional branch instruction in general depends upon the state of a condition. If the condition is of one state, the address of the next instruction to be executed may be simply the next sequential instruction address following the address of the conditional branch instruction, i.e., the fall-through address; whereas if the condition is of another state, the address of the next instruction to be executed will be the target address for the conditional branch instruction, which will usually be different from the next sequential address.

The evaluation of the condition associated with a conditional branch instruction may take several or more clock cycles, which may cause stalls among some pipelined processors. Furthermore, for an indirect conditional branch instruction (denoted as an "indirect branch instruction" for brevity), the target address is stored in a register. However, a pipelined processor may not read these registers until some number of pipe stages after instruction fetch, which may add to processor stalls.

DESCRIPTION OF EMBODIMENTS

To reduce stalls in a pipelined processor, it is useful to provide a processor architecture in which its instruction set includes instructions that provide prediction information regarding conditional branch instructions. This static prediction information provides information as to whether a conditional branch instruction is statically predicted as taken, and provides a statically predicted target address associated with the conditional branch instruction. We will refer to instructions that provide prediction information as predict instructions. Predict instructions provide advanced information of forthcoming conditional branch instructions to a processor to enable the processor's branch prediction logic to be more accurate and efficient.

A predict instruction also provides information regarding the address of the conditional branch instruction it refers to. This information is needed by the processor so that it can associate predicted target addresses with their corresponding conditional branch instructions.

During compilation of code, a compiler has the option of scheduling a predict instruction before a conditional branch instruction, and encoding static prediction information within the predict instruction. This static prediction information provided by the compiler may or may not be used by the processor's branch prediction logic. Nevertheless, such static prediction information may be useful to a processor, and indeed, may be the only prediction information available to the processor when it first encounters a conditional branch instruction.

Figure 1:
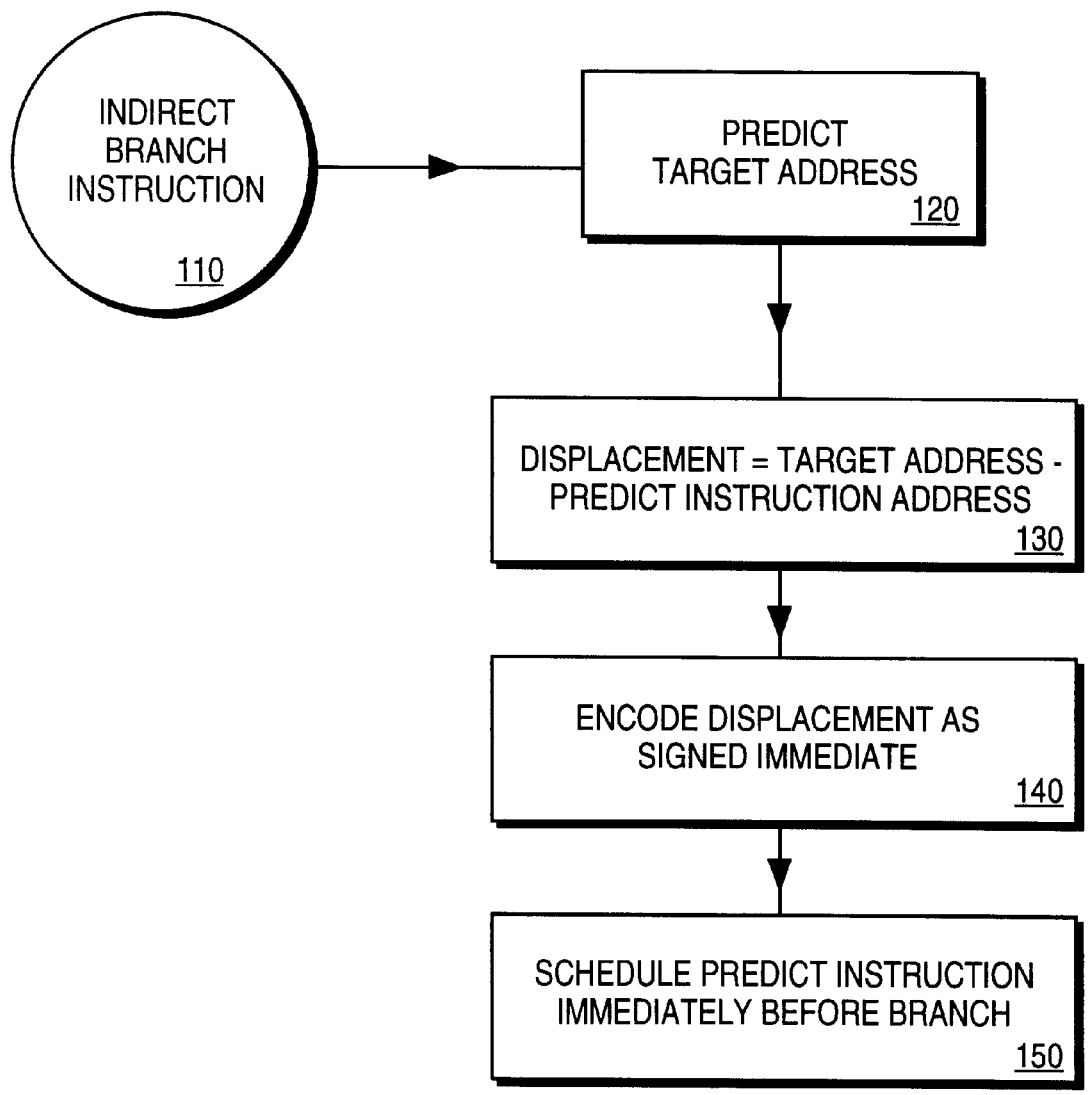
FIG. 1 a high-level flow diagram for providing a predicted target address for an indirect conditional branch instruction by using a predict instruction.

When a predicted target address for a conditional branch instruction is estimated or determined by a compiler, the compiler can use a predict instruction that may specify the predicted target address as an offset or displacement from the instruction address of the predict instruction, or as an absolute address. This predict instruction is scheduled before its corresponding conditional branch instruction. An example is illustrated by FIG. 1. For indirect branch instruction 110, a predicted target address is statically determined by a compiler in step 120. Any method for target address prediction may be employed. A displacement is determined in step 130 as the difference between the predicted target address and the instruction address for a predict instruction. In step 140, the displacement is encoded as a signed immediate within the predict instruction. In step 150, the predict instruction is scheduled before the indirect branch instruction referenced by the predict instruction. FIG. 1 also applies in general to conditional branch instructions as well as to indirect branch instructions.

Figure 2:
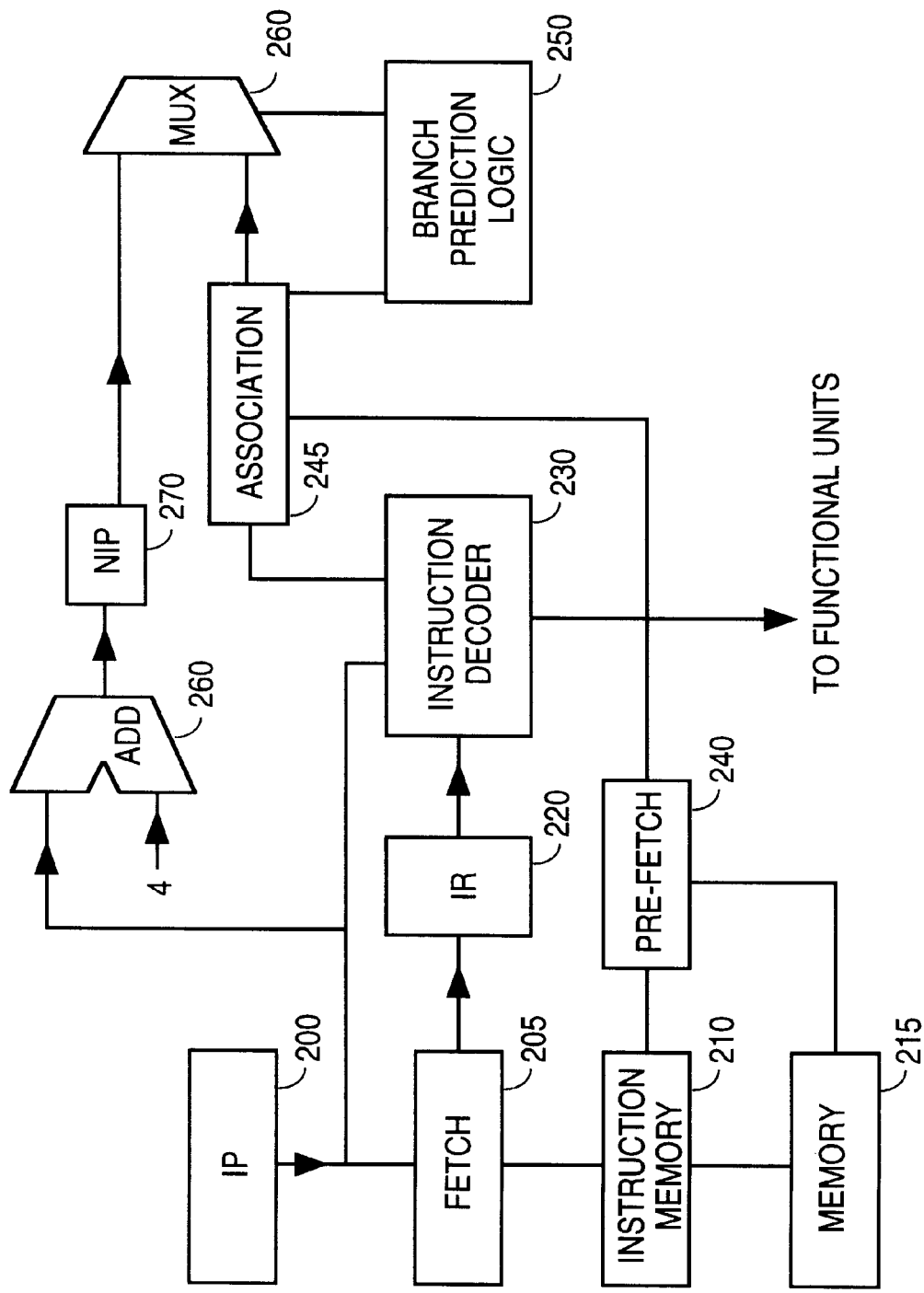
FIG. 2 a high-level abstraction of a portion of a processor architecture for supporting an instruction set having a predict instruction.

FIG. 2 illustrates a high-level abstraction of a portion of a processor architecture for implementing an instruction set having predict instructions. Only high-level functional blocks related to instruction fetching, decoding, and branch prediction are indicated. Not shown are functional units for execution (such as floating point and arithmetic logic functional units), re-order buffers (if applicable), pipeline registers, functional units to map virtual addresses to physical addresses, and additional functional units that are well known in the art of computer architecture design. It is immaterial to the scope of the present invention as to whether a processor employs an architecture identified as a complex instruction set computer (CISC), a reduced instruction set computer (RISC), a hybrid of a CISC and a RISC, a super scalar pipelined computer, a very long word length computer, a scoreboarding architecture, a data-flow architecture (e.g., a Tomasulo architecture), or any other architecture.

Referring to FIG. 2, Instruction Pointer (IP) 200 is a register for holding the address of the next instruction to be fetched. For some processors, a bundle of instructions may be fetched together, so that the value of IP 200 indicates the address of the bundle. For simplicity of discussion only, we assume that only one instruction is fetched for each clock cycle. The generalization of the following discussion to processors fetching a bundle of instructions should be obvious to those skilled in the art of computer architecture.

Based upon IP 200, an instruction is retrieved from Instruction Memory cache 210 by Fetch unit 205. Instruction Memory 210 is part of a memory hierarchy, which may also include other levels of cache, main memory, and hard disks, which are represented by Memory unit 215. It is well know in the art how to handle cache misses if the desired instruction is not present in Instruction Memory 210. A fetched instruction is placed in Instruction Register (IR) 220. Instruction Decoder unit 230 decodes the op-code field in the fetched instruction to determine its operation, as well as decoding other fields within the fetched instruction.

If the op-code field in the fetched instruction in IR 220 is decoded by Instruction Decoder 230 to be a predict operation, (i.e., the fetched instruction is a predict instruction), then in one example of a processor architecture an instruction pointer relative address is decoded from a field within the fetched instruction and added to the current address in IP 200 to obtain a predicted target address. Without loss of generality, this addition function may be considered to be part of Instruction Decoder 230. This instruction pointer relative address is inserted in the predict instruction by the compiler. Processor architectures and instruction sets may also employ absolute addressing in a predict instruction, so that the predicted target address is decoded directly from the predict instruction without the need for an addition function. Indeed, processor architectures and instruction sets may employ any type of mapping function between the predicted target address and the value stored in the field that provides the predicted target address information. For example, the predicted target address may be obtained by concatenating the value stored in the appropriate field of the predict instruction with the first n high-order bits of the instruction address of the predict instruction, where n is some integer less than the word length.

Instruction Decoder 230 also decodes the predict instruction to obtain the instruction address of the conditional branch instruction to which the predict instruction refers to, and we refer to this instruction address as the referenced instruction address and we refer to this conditional branch instruction as the referenced conditional branch instruction. Again, any form of mapping between the referenced instruction address and the value stored in the appropriate field of the predict instruction may be employed, as discussed above regarding the predicted target address.

For each fetched predict instruction, Association unit 245 associates the predicted target address decoded from the fetched predict instruction with the instruction address of the referenced conditional branch instruction. Association 245 may, for example, comprise a cache comprising tags and their corresponding entries, where a tag comprises an instruction address for a referenced conditional branch instruction and its associated entry is the predicted target address associated with the referenced conditional branch instruction. If the referenced conditional branch instruction is eventually fetched by Fetch 205 (it may not be fetched if intervening branches are present between it and the predict instruction referencing it), and if the referenced conditional branch instruction is speculatively taken, then Association 245 is accessed to obtain the predicted target address associated with the instruction address for the referenced conditional branch instruction, so that the predicted target instruction having an instruction address matching the predicted target address may be fetched by Fetch 205.

Association 245 may also store prediction information in addition to predicted target addresses. A predict instruction itself may have information in an appropriate field to indicate whether the compiler has statically predicted its referenced conditional branch instruction as taken or not, and this field is also decoded by Instruction Decoder 230 and communicated to Association 245. Furthermore, this field may be more than one bit wide, so that the compiler might provide a relative weight as to the likelihood that the referenced conditional branch instruction is to be taken. This static prediction information can be stored in entries in Association 245 along with predicted target addresses.

Association 245 may also provide a predicted target address to Pre-Fetch unit 240 before its corresponding referenced conditional branch instruction is fetched by Fetch 205. For a predicted target address provided by Association 245 to Pre-Fetch 240, if the predicted target instruction having an instruction address matching the predicted target address is not found in Instruction Memory 210, then Pre-Fetch 240 retrieves the predicted target instruction from Memory 215 and places it in Instruction Memory 210 so that it will be quickly available for fetching by Fetch 205. The function provided by Pre-Fetch 240 may be part of Fetch 205, but separate functional units 240 and 205 are shown for simplicity of discussion. Pre-Fetch 240 therefore provides a pre-fetch function. Association 245 may itself store pre-fetched predicted target instructions, so that it also associates predicted target instructions with referenced instruction addresses.

If a referenced conditional branch instruction is fetched and decoded by Instruction Decoder 230, then Branch Prediction Logic 250 determines if the referenced conditional branch instruction is to be speculatively taken. Branch Prediction Logic 250 may use dynamic techniques. It also has access to any static prediction information stored in Association 245, but it may "ignore" this static prediction information provided by the compiler. However, if Branch Prediction Logic 250 has no dynamically obtained information as to the likelihood of the referenced conditional branch instruction being actually taken, then the static prediction information provided by the compiler and stored in Association 245 may be the only prediction information available to the processor.

ADD unit 260 provides the next sequential instruction address to Next Instruction Pointer (NIP) register 270. From the inputs to ADD 260, it is seen that the next sequential instruction address is 4 bytes from the current address in IP 200. However, other processors may provide for larger increments to advance to the next sequential instruction address, such as computers employing word lengths larger than 32 bits, or computers with very long word length architectures.

Addresses provided by NIP 270 and Association 245 are available to Multiplex unit (MUX) 260. If Branch Prediction Logic 250 predicts that a fetched and decoded referenced conditional branch instruction is to be speculatively taken, then its predicted target address stored in Association 245 is provided to IP 200 via MUX 260, so that the predicted target instruction is to be fetched next. If Branch Prediction Logic 250 predicts that the referenced conditional branch instruction is not to be speculatively taken, then the result from NIP 270 is provided to IP 200, so that the fall-through instruction is to be fetched next.

Because a predict instruction provides a predicted target address once the predict instruction has been decoded, it is not necessary for the compiler to schedule a predict instruction far in advance of its referenced conditional branch instruction. This simplifies the compiler's task.

Not shown in FIG. 2 is the logic required to flush pipelines in the processor if the prediction of Branch Prediction Logic 250 is found to be incorrect when the condition associated with the fetched referenced conditional branch instruction is finally evaluated, or if the fetched referenced conditional branch instruction was correctly predicted as taken by Branch Prediction Logic 250 but its predicted target address was incorrect.

Predict instructions may also provide value for branch instructions in general, whether conditional or unconditional. In particular, for an indirect unconditional branch instruction, although it is known a priori that the branch instruction is to be "taken", the target instruction address is stored in a register, and reading this register may take several clock cycles from the time that the branch instruction is decoded. It may therefore speed up a processor if a predict instruction is scheduled before an indirect unconditional branch instruction to provide the predicted target address before the indirect unconditional branch instruction is decoded. Furthermore, the predicted target instruction may be pre-fetched, so that it will be available in a high-speed cache when the indirect unconditional branch instruction is fetched and decoded. Therefore, the previously disclosed processor architecture and instruction set is also understood to apply to the case of using branch instructions in general.

FIG. 2 represents only a high-level abstraction of a processor architecture, and it should be clear to one of ordinary skill in the art of computer architecture that various functional blocks illustrated in FIG. 2 may be combined together or split into multiple functional blocks. In general, various modifications may be made to the above processor architecture without departing from the scope and spirit of the invention as claimed below.

What is claimed is:

1. A method for providing a predicted target instruction in a processor, the method comprising:

decoding an instruction set, wherein the instruction set includes:
   an operation code to indicate a branch instruction;
   an operation code to indicate a predict instruction, wherein each predict instruction has a first field and a second field to provide a referenced instruction address and a predicted target address, respectively;

decoding a first instruction as a predict instruction;

decoding a first field and a second field of the first instruction to provide a first referenced instruction address and a first predicted target address, respectively;

retrieving from memory a predicted target instruction having an instruction address corresponding to the first predicted target address;

decoding a second instruction as a branch instruction, where the second instruction has an instruction address corresponding to the first referenced instruction address; and storing in an association unit the first referenced instruction address and the first predicted target address as an associated pair of addresses;

wherein, the step of retrieving from memory the predicted target instruction is performed before the step of decoding the second instruction only if the associated pair of addresses is resident in the association unit.

2. The method as set forth in claim 1, further comprising:
executing the predicted target instruction if the second instruction is speculatively taken.

3. A method for providing a predicted target instruction in a processor, the method comprising:

decoding an instruction set, wherein the instruction set includes:
   an operation code to indicate a branch instruction;
   an operation code to indicate a predict instruction, wherein each predict instruction has a first field and a second field to provide a referenced instruction address and a predicted target address, respectively;

decoding a first instruction as a predict instruction;

decoding a first field and a second field of the first instruction to provide a first referenced instruction address and a first predicted target address, respectively;

retrieving from memory a predicted target instruction having an instruction address corresponding to the first predicted target address;

decoding a second instruction as a branch instruction, where the second instruction has an instruction address corresponding to the first referenced instruction address;

storing in an association unit the first referenced instruction address and the first predicted target address as an associated pair of addresses; and accessing the association unit to obtain the first predicted target address only if the second instruction has been decoded.

* * * * *